United States Patent
Ghosh et al.

(10) Patent No.: US 12,046,155 B1
(45) Date of Patent: Jul. 23, 2024

(54) AUTOMATIC EVALUATION OF ARGUMENTATIVE WRITING BY YOUNG STUDENTS

(71) Applicant: Educational Testing Service, Princeton, NJ (US)

(72) Inventors: Debanjan Ghosh, Cambridge, MA (US); Beata Beigman Klebanov, Hopewell, NJ (US)

(73) Assignee: Educational Testing Service, Princeton, NJ (US)

( * ) Notice: Subject to any disclaimer, the term of this patent is extended or adjusted under 35 U.S.C. 154(b) by 767 days.

(21) Appl. No.: 17/223,390

(22) Filed: Apr. 6, 2021

Related U.S. Application Data

(60) Provisional application No. 63/006,406, filed on Apr. 7, 2020.

(51) Int. Cl.
*G09B 7/02* (2006.01)
*G06F 40/20* (2020.01)
*G06N 20/00* (2019.01)

(52) U.S. Cl.
CPC .............. *G09B 7/02* (2013.01); *G06F 40/20* (2020.01); *G06N 20/00* (2019.01)

(58) Field of Classification Search
None
See application file for complete search history.

(56) References Cited

PUBLICATIONS

Beigman Klebanov, Beata, Gyawali, Binod, Song, Yi; Detecting Good Arguments in a Non-Topic-Specific Way: An Oxymoron?; Proceedings of the 55th Annual Meeting of the Association for Computational Linguistics (Short Papers); Vancouver, Canada; pp. 244-249; Aug. 2017.

Blanchard, Daniel, Tetreault, Joel, Higgins, Derrick, Cahill, Aoife, Chodorow, Martin; Toefl11: A Corpus of Non-Native English; Educational Testing Service, Research Report RR-13-24; Nov. 2013.

Burstein, Jill, Marcu, Daniel, Knight, Kevin; Finding the Write Stuff: Automatic Identification of Discourse Structure in Student Essays; IEEE Intelligent Systems: Special Issue on Advances in Natural Language Processing, 18(1); pp. 32-39; 2003.

Chakrabarty, Tuhin, Hidey, Christopher, Muresan, Smaranda, Mckeown, Kathleen, Hwang, Alyssa; Ampersand: Argument Mining for PERSuAsive oNline Discussions; Proceedings of the Conference on Empirical Methods in Natural Language Processing and the 9th International Joint Conference on Natural Language Processing; Hong Kong, China; pp. 2933-2943; Nov. 2019.

(Continued)

*Primary Examiner* — Stella L. Woo
(74) *Attorney, Agent, or Firm* — Jones Day

(57) ABSTRACT

Systems and methods are provided for automatic evaluation of argument critique essays written by young students in response to prompts. A transformer pre-trained for natural language processing is employed as a machine learning model, which is fine-tune with a first training dataset comprising unannotated argument critique essays written by college students, and then fine-tuned with a second training dataset comprising annotated argument critique essays written by middle school students, where each sentence in the second training dataset is annotated for the presence of valid critiques to prompts. The fine-tuned machine learning model is used to classify each sentence in an essay to be evaluated as either containing a valid critique or not.

20 Claims, 8 Drawing Sheets

(56) References Cited

PUBLICATIONS

Devlin, Jacob; Chang, Ming-Wei, Lee, Kenton, Toutanova, Kristina; Bert: Pre-Training of Deep Bidirectional Transformers for Language Understanding; Proceedings of the Conference of the North American Chapter of the Association for Computational Linguistics: Human Language Technologies, vol. 1; Minneapolis, MN; pp. 4171-4186; Jun. 2019.

Farra, Noura, Somasundaran, Swapna, Burstein, Jill; Scoring Persuasive Essays Using Opinions and Their Targets; Proceedings of the 10th Workshop on Innovative Use of NLP for Building Educational Applications; Denver, CO; pp. 64-74; Jun. 2015.

Ghosh, Debanjan, Khanam, Aquila, Han, Yubo, Muresan, Smaranda; Coarse-Grained Argumentation Features for Scoring Persuasive Essays; Proceedings of the 54th Annual Meeting of the Association for Computational Linguistics; Berlin, Germany; pp. 549-554; Aug. 2016.

Nguyen, Huy, Litman, Diane; Context-Aware Argumentative Relation Mining; Proceedings of the 54th Annual Meeting of the Association for Computational Linguistics; Berlin, Germany; pp. 1127-1137; August 2016.

Nguyen, Huy, Litman, Diane; Argument Mining for Improving the Automated Scoring of Persuasive Essays; 32nd AAAI Conference on Artificial Intelligence; pp. 5892-5899; 2018.

Persing, Isaac, NG, Vincent; Modeling Prompt Adherence in Student Essays; Proceedings of the 52nd Annual Meeting of the Association for Computational Linguistics; Baltimore, MD; pp. 1534-1543; Jun. 2014.

Persing, Isaac, NG, Vincent; Modeling Argument Strength in Student Essays; Proceedings of the 53r Annual Meeting of the Association for Computational Linguistics and the 7th International Joint Conference on Natural Language Processing; Beijing, China; pp. 543-552; Jul. 2015.

Persing, Isaac, NG, Vincent; End-to-End Argumentation Mining in Student Essays; Proceedings of the 2016 Conference of the North American Chapter of the Association for Computational Linguistics: Human Language Technologies; pp. 1384-1394; Jun. 2016.

Reimers, Nils, Schiller, Benjamin, Beck, Tilman, Daxenberger, Johannes, Stab, Christian, Gurevych, Iryna; Classification and Clustering of Arguments with Contextualized Word Embeddings; Proceedings of the 57th Annual Meeting of the Association for Computational Linguistics; Florence, Italy; pp. 567-578; Jul. 2019.

Song, Yi, Deane, Paul, Beigman Klebanov, Beata; Toward the Automated Scoring of Written Arguments: Developing an Innovative Approach for Annotation; ETS Research Report, RR-17-11; Dec. 2017.

Song, Yi, Deane, Paul, Fowles, Mary; Examining Students' Ability to Critique Arguments and Exploring the Implications for Assessment and Instruction; ETS Research Report, RR-17-16; Dec. 2017.

Stab, Christian, Gurevych, Iryna; Parsing Argumentation Structures in Persuasive Essays; Computational Linguistics, 43(3); pp. 619-659; Sep. 2017.

Stab, Christian, Gurevych, Iryna; Recognizing Insufficiently Supported Arguments in Argumentative Essays; Proceedings of the 15th Conference of the European Chapter of the Association for Computational Linguistics: vol. 1, Long Papers; Valencia, Spain; pp. 980-990; Apr. 2017.

Vaswani, Ashish, Shazeer, Noam, Parmar, Niki, Uszkoreit, Jakob, Jones, Llion, Gomez, Aidan, Kaiser, Lukasz, Polosukhin, Illia; Attention Is All You Need; 31st Conference on Neural Information Processing Systems; Long Beach, CA; pp. 5998-6008; 2017.

Walton, Douglas; Argumentative Schemes for Presumptive Reasoning; Lawrence Erlbaum: Mahwah, NJ; 1996.

Dear Editor,

Advertising aimed at children under 12 should be allowed for several reasons.

First, one family in my neighborhood sits down and watches TV together almost every evening. The whole family learns a lot, which shows that advertising for children is always a good thing because it brings families together.

Second, research shows that children can't remember commercials well anyway, so they can't be doing kids any harm.

Finally, the arguments against advertising aren't very effective. Some countries banned ads because kids thought the ads were funny. But that's not a good reason. Think about it: the advertising industry spends billions of dollars a year on ads for children. They wouldn't spend all the money if the ads weren't doing some good. Let's not hurt children by stopping a good thing.

If anyone doesn't like children's adds, the advertisers should just try to make them more interesting. The ads are allowed to be shown on TV, so they shouldn't be banned.

— 110

NoArg

The first one about the family in your neighborhood is more like an opinion, not actual information from the article.

— 130

Arg

Just because it brings one family together to learn does not mean that it will bring all families together to learn.

— 120

NoArg

Their claims are badly written and have no good arguments. They need to support their claims with SOLID evidence and only claim arguments that can be undecicive.

Arg

| 210 { | 220 — Just because it brings one family together to learn does not mean that it will bring all families together to learn. |
| --- | --- |
| | 230 — Second, "children can't remember commercials anyway, so they can't be doing any harm", says the letter. |

| 240 { | 250 — I say this because in an article I found out that children do remember advertisments that they have seen before. |
| --- | --- |
| | 260 — END_SENTENCE |

| 280 — | Finally, is spending billions of dollars on something that has no point a good thing? |
| --- | --- |
| | There are many arguments that all this money is just going to waste, and it could be used on more important things. |

| 270 — | They weren't made to be appealing to adults. |
| --- | --- |
| | They only need kids to want the product, and beg their parents for it. |

*Fig. 2*

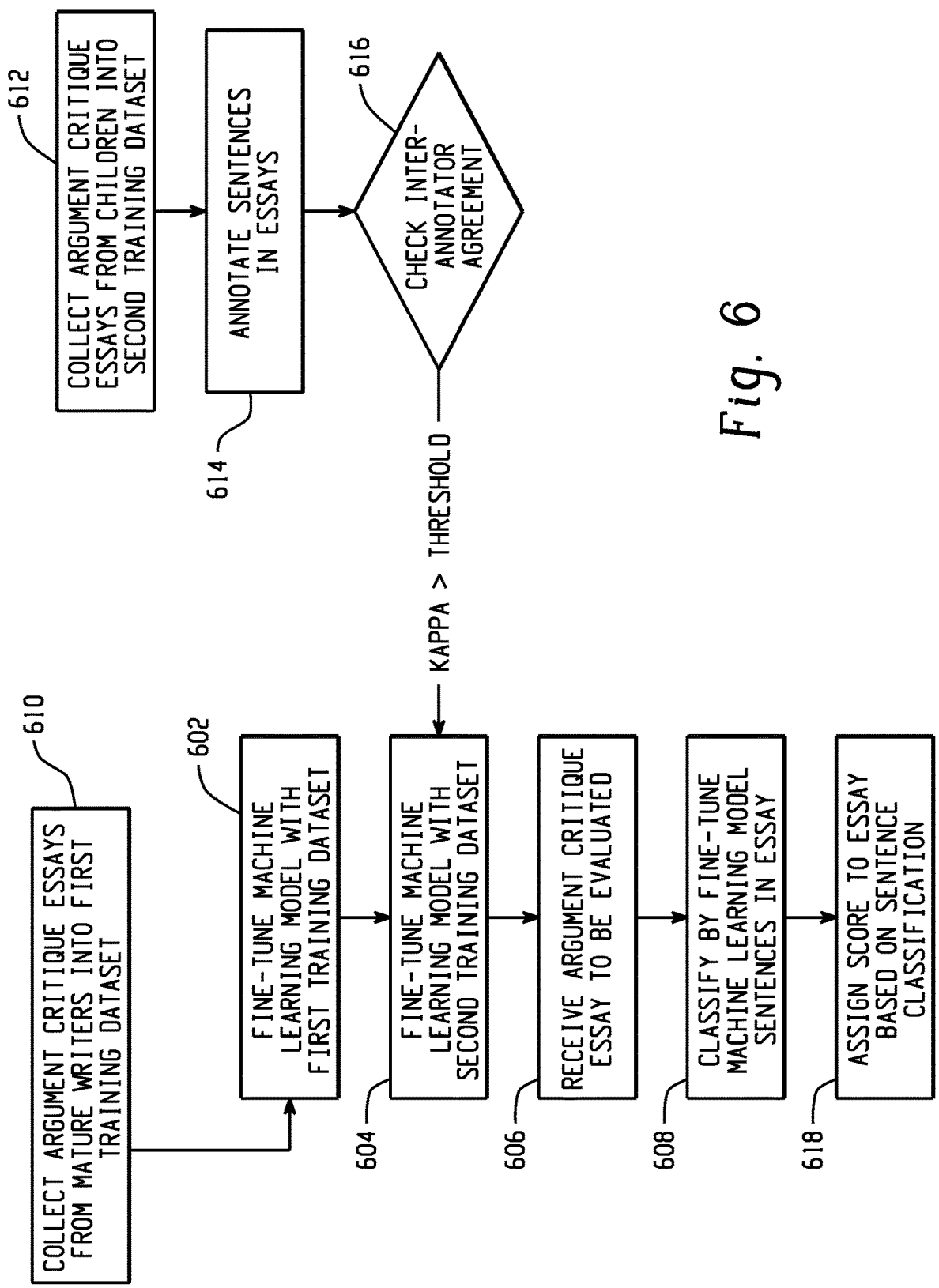

AUTOMATIC EVALUATION OF ARGUMENTATIVE WRITING BY YOUNG STUDENTS

CROSS-REFERENCE TO RELATED APPLICATIONS

This application claims priority to U.S. Provisional Application No. 63/006,406, entitled "Exploratory Study of Argumentative Writing by Young Students," filed Apr. 7, 2020, the entirety of which is herein incorporated by reference.

FIELD

The technology described herein relates to automatic evaluation of written essays, and more specifically to evaluation of argument critique essays written by young students in response to prompts.

BACKGROUND

The use of argument and logic is important in academic writing as they expand critical thinking capacities of students. Argumentation requires systematic reasoning and the skill of using relevant examples to craft a support for one's point of view. The present disclosure relates to assessing writing skills using automated scoring systems. The present disclosure further relates automated scoring systems that are AI-informed and argumentation-aware.

SUMMARY

Systems and methods are provided for automatic evaluation of argument critique essays written by young students. In one embodiment, for example, the disclosure relates to a computer-implemented method for automatically evaluating an argument critique essay. The method comprises (i) fine-tuning a machine learning model with a first training dataset, wherein the first training dataset comprises unannotated argument critique essays written by mature writers; (ii) fine-tuning the machine learning model with a second training dataset, wherein the second training dataset comprises argument critique essays written by young writers, and each sentence of each argument critique essay in the second training dataset is annotated for whether the sentence contains any valid critique; (iii) receiving the argument critique essay to be evaluated; (iv) classifying by the machine learning model every sentence in the argument critique essay to be evaluated as either containing a valid critique or not; and (v) assigning a score to the argument critique essay to be evaluated based on a total number of sentences in the argument critique essay that are classify by the machine learning model as containing a valid critique.

In another embodiment, for example, the disclosure relates to a system for automatically evaluating an argument critique essay written by a child in response to a prompt. The system comprises a processor; and a computer-readable memory in communication with the processor. The computer readable memory is encoded with instructions for commanding the processor to execute steps comprising (i) receiving the argument critique essay to be evaluated; (ii) classifying by a machine learning model every sentence in the argument critique essay to be evaluated as either containing a valid critique or not containing any valid critique, wherein a valid critique comprises any criticism of the prompt on a ground of over generalization, irrelevant example, misrepresentation of events, or neglecting negative side effects; and (iii) assigning a score to the argument critique essay to be evaluated based on a total number of sentences in the argument critique essay that are classify by the machine learning model as containing a valid critique. The machine learning model is fine-tuned using (i) a first training dataset comprising unannotated argument critique essays written by adults; and (ii) a second training dataset comprising argument critique essays written by children, and each sentence of each argument critique essay in the second training dataset is annotated for whether the sentence contains any valid critique.

In another embodiment, for example, the disclosure relates to a method for configuring a machine learning model for evaluating argument critique essay written by children. The method comprises (i) fine-tuning the machine learning model with a first training dataset comprising unannotated argument critique essays written by mature writers; and (ii) fine-tuning the machine learning model with a second training dataset comprising argument critique essays written by children. In the second training dataset, the argument critique essays written by children are arranged as a plurality of paired sentences, wherein each pair in the plurality of paired sentences comprises a first sentence and a second sentence. The first sentence is annotated for whether the sentence contains any valid critique, such as any criticism of on a ground of over generalization, irrelevant example, misrepresentation of events, or neglecting negative side effects. The second sentence that is the immediate next sentence following the first sentence in an argument critique essay. When the first sentence is the last sentence in the argument critique essay, the second sentence is replaced with a special token.

The subject matter described herein provides many technical advantages. These technical advantages include a more accurate assessment of argument critique essays, lower cost and shorter time for scoring such essays, and more objective scoring that is less dependent on idiosyncrasies of human scorers. Furthermore, the systems and methods described herein is able to perform effectively while leveraging a relatively small training corpus of annotated essays.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

FIG. 1 illustrates the learning-and-assessment context in which young students write argument critique essays.

FIG. 2 depicts the paired sentence data representation in the training dataset.

FIG. 6 is a flowchart diagram depicting a computer-implemented method for automatically evaluating an argument critique essay.

DETAILED DESCRIPTION

Figure 3:
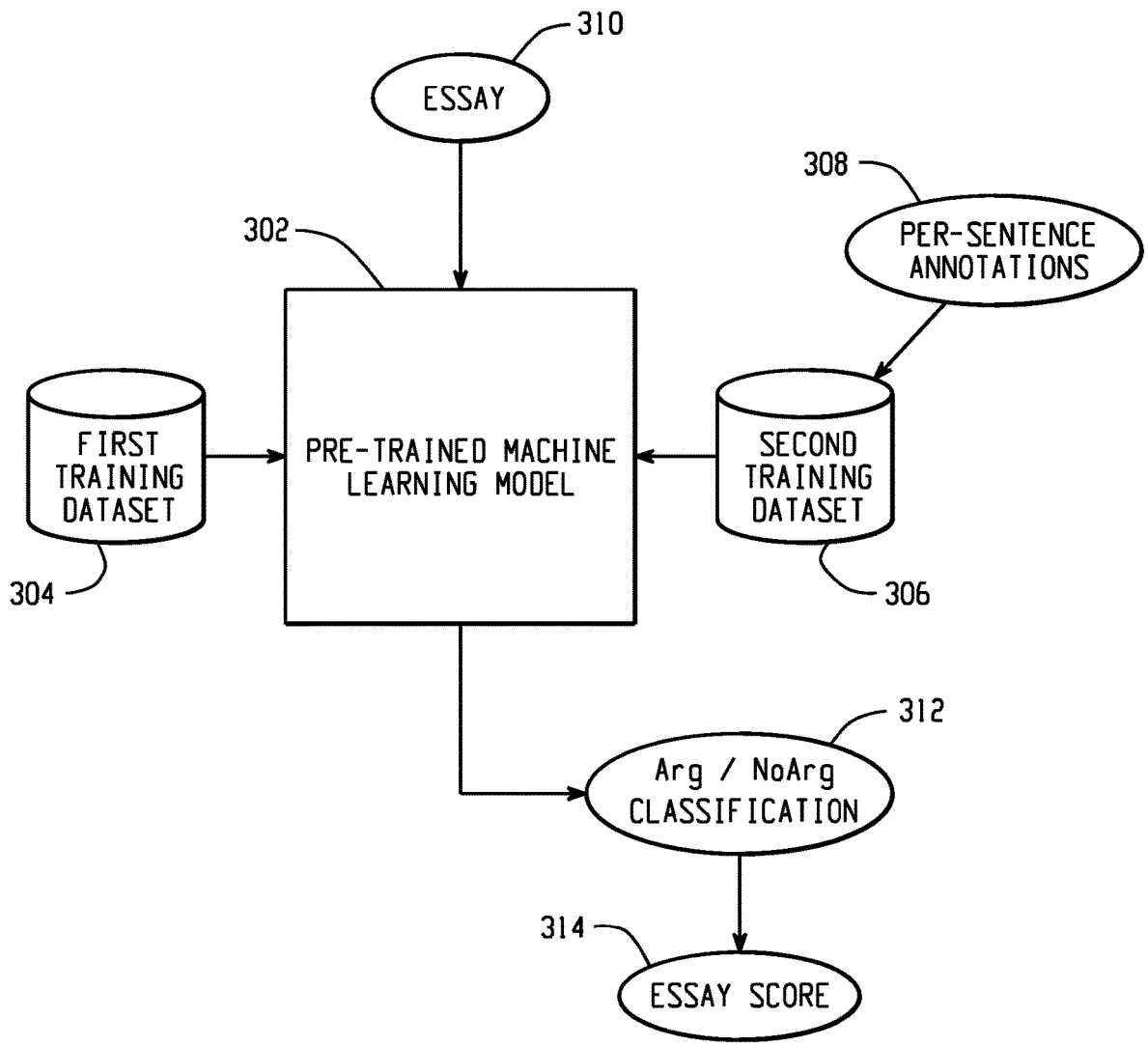
FIG. 3 is a block diagram depicting a computer-implemented system for automatically evaluating an argument critique essay written by a child in response to a prompt.

Computational analysis of argumentative writing in educational context may include automatically identifying argument structures (e.g., argument components and their relations) in essays, and such systems and methods give essay scores from features derived from structures (e.g., the number of claims and premises, the number of supported claims). Systems may also score a particular dimension of essay quality, such as relevance to prompt, opinions and their targets, argument strength, among others. Such systems may be focused on analyzing college-level writing, such as writing of university students, and undergraduate entrance examination essays.

These scoring systems and methods may perform poorly on essays written by children because they rely on capturing structural features that are common in argumentative essays. However, children's writing is shorter, less formal, and does not have the well-organized nature of the mature writing, where essays have identifiable discourse elements such as thesis, main claim, support, and conclusion.

Argument critique essays occur the learning-and-assessment context where middle school students are asked to criticize an argument presented in a prompt. In such a writing task, young students are asked to analyze a given prompt, and then write responses that identify and explain the flaws in the reasoning of the prompt. The task is similar to well-established writing exercises for college students. Compared to similar writing tasks at the college level, the prompt for children usually has more obvious reasoning errors. Such writing tasks for children also different in the types of response they elicit. While a full essay-length response is expected at the level of college students, these argument critique tasks for children often elicit shorter and less formal responses.

FIG. 1 illustrates this learning-and-assessment context in which young students are asked to argument critique essays. Prompt 110 is a letter to an editor arguing that advertising to children under the age of twelve should be allowed. Middle school students are asked to review the letter and evaluate problems in the letter's reasoning or use of evidence. Students are then asked to produce a written critique of the arguments demonstrating their ability to identify and explain the problems. Excerpts 120, 130, and 140 are examples of the young students' writing. Excerpt 120 shows a well-articulated critique of the hasty generalization problem in the prompt. Excerpt 120 is a sentence that contains a valid critique. There are a range of valid critiques of the arguments in the letter, including overgeneralized example, irrelevant example, misrepresentation of events, neglecting negative side effects, etc. All sentences containing any valid critique is denoted as Arg (or otherwise denoted as NoArg).

Many students have difficulty explaining the reasoning flaws clearly. In excerpt 130, the student thinks that the argument based on the family in the neighborhood is not strong, but his explanation does not demonstrate an understanding of the flaw of a weak generalization. Other commonly countered issues include students summarizing the prompt without criticizing, or providing a generic critique that does not adhere to the particulars of the prompt such as in excerpt 140. Excerpts 130 and 140 are therefore denoted as NoArg.

The present disclosure provides systems and methods that automatically classify, by a machine learning model, every sentence in an argument critique essay to be evaluated as either Arg or NoArg, i.e. a determination of whether the sentence contains any valid critique.

The machine learning model may be a pre-trained language model that is effective in various natural language processing (NLP) applications. Such pre-trained language models can advantageously leverage a relatively small training dataset. In one embodiment, for example, the machine learning model is Bidirectional Encoder Representations from Transformers (BERT), which is a bi-directional transformer-based architecture that performs well on argumentation tasks such as argument component and relation identification and argument clustering. The BERT model is pre-trained over a 3.3 billion word English corpus on two tasks: (1) given a sentence containing multiple masked words predict the identity of a particular masked word, and (2) given two sentences, predict whether they are adjacent. A standard pre-trained BERT model can be used for transfer learning by fine-tuning on classification data of Arg and NoArg sentences, and/or by fine-tuning the BERT language model on a large corpus from a partially relevant domain, such as a corpus of writings from advanced students.

The pre-trained machine learning model may be fine-tuned on a domain-specific corpus to boost performance. In one embodiment, for example, the machine learning model is fine-tuned with a first training dataset comprising a large corpus of unannotated argument critique essays. The essays in the first training dataset are written by, for example, mature writers, adults, advanced students, or college students. The first training dataset may comprise, for example, 350 thousand essays, which comprise a total of 5.6 million sentences. The first training dataset may, for example, comprise at least 350, 300, 200, or 100 thousand essays, which may comprise, for example, a total of at least 5.6, 5.5, 5, 4, 3, 2, or 1 million sentences. Fine-tuning the model with the first training dataset can improve the performance of the model, and in particular the recall rate of the model. It is likely that some basic local sequential patterns do exist in young students' writings, and these patterns are sufficiently similar to the ones in adult writing that a system with its language model tuned on adult critique writing can capitalize on this knowledge.

In one embodiment, for example, the machine learning model is further fine-tuned with a second training dataset comprising annotated argument critique essays. The essays in the second training dataset are written by, for example, young writers, children, young students, or middle school. The second training dataset may contain a smaller number of essays than the first training dataset. The second training dataset may contain a smaller number of sentences in total than the first training dataset. The second training dataset may comprise, for example, 580 essays, which comprise a total of 2.2 thousand sentences. The second training dataset may comprise, for example, at least 550, 500, 400, 300, 200, or 100 essays, which may comprise, for example, a total of at least 2.2, 2, or 1 thousand sentences.

As part of a training process, the sentences in the second training dataset may be annotated as Arg or NoArg. The Arg or NoArg classification may be carried out by multiple annotators. The inter-annotator agreement for the sentence-level Arg/NoArg classification may be measured by a kappa statistics, such as Cohen's kappa or Fleiss' kappa. The inter-annotator agreement have a kappa value of, for example 0.71. The inter-annotator agreement have a kappa value of, for example, at least 0.7, 0.6, or 0.5. A higher kappa value indicates better agreement between different annotators. A kappa value above 0.6 would indicate that there is substantial agreement between the classification by the different annotators. A kappa value above 0.8 would indicate that the agreement is almost perfect.

In one embodiment, the sentences in the second training dataset are organized as paired sentences. Each pair comprises a first sentence with the Arg/NoArg annotation and a second sentence that is the immediate next sentence following the first sentence in the same argument critique essay. When the first sentence is the last sentence in the essay, the second sentence is replaced with a token indicating the end of the essay. Fine-tuning the model with the paired sentences the second training dataset can improve the performance of the model. The paired sentence data representation may help the BERT model for two reasons. First, pairing of the candidate sentence for the Arg/NoArg annotation and the next one can encourage the model to more directly utilize the next sentence prediction task. Secondly, this pairing may aid BERT in exploiting any sequential structures that may be present in the dataset.

In one embodiment, an essay score is calculated for the argument critique essay to be evaluated based on the per-sentence Arg/NoArg classifications generated by the machine learning model. In one embodiment, the essay score is calculated from the total number of Arg sentences. In one embodiment, the essay score is calculated based on the total number of Arg sentences in relation to the total number of sentences in the argument critique essay, which may be, for example, their ratio. In one embodiment, the essay score is the ratio of total number of Arg sentences to the total number of Arg and NoArg sentences in the argument critique essay.

FIG. 2 illustrates the structure of the paired sentence instances in the training dataset. Training instances 210, 240, 270, and 280 are all examples of the pair sentence data representation. For example, training instance 210 contains a first sentence 220 and a second sentence 230. The first sentence 220 is annotated as Arg. The second sentence 230 is the immediate next sentence following the first sentence 220 from the same student essay. Training instance 240 is another example, which contains a first sentence 250 and an END SENTENCE special token 260. The token 260 indicates that the first sentence 250 is the last sentence in the student essay.

FIG. 3 is a block diagram depicting a computer-implemented system for automatically evaluating an argument critique essay written by a child in response to a prompt. The pre-trained machine learning model 302 receives an essay 310 to be evaluated, and then generates a binary classification 312 for each sentence in the essay 310 indicating whether the sentence contains any valid criticism of the prompt. From the classification 312, the computer-implemented system then calculates an essay score 314 based on the proportion of sentences in the argument critique essay that are classify as containing any valid criticism. In the computer-implemented system, the machine learning model 302 outputs the classification 312 by leveraging the essays stored in training datasets. In the example of FIG. 3, the training datasets for the machine learning model 302 comprise a large first training dataset 304, and a comparatively smaller second training dataset 306. The first training dataset 304 contains unannotated argument critique essays written by authors of mature writing and reasoning skills, such as college students. The second training dataset 306 contains argument critique essays written by authors of comparable writing and reasoning skills as the author of the essay to be evaluated 310. The essays in the second training dataset are associated with per-sentence annotations 308, which indicate the presence of valid critique in each sentence.

Figure 4:
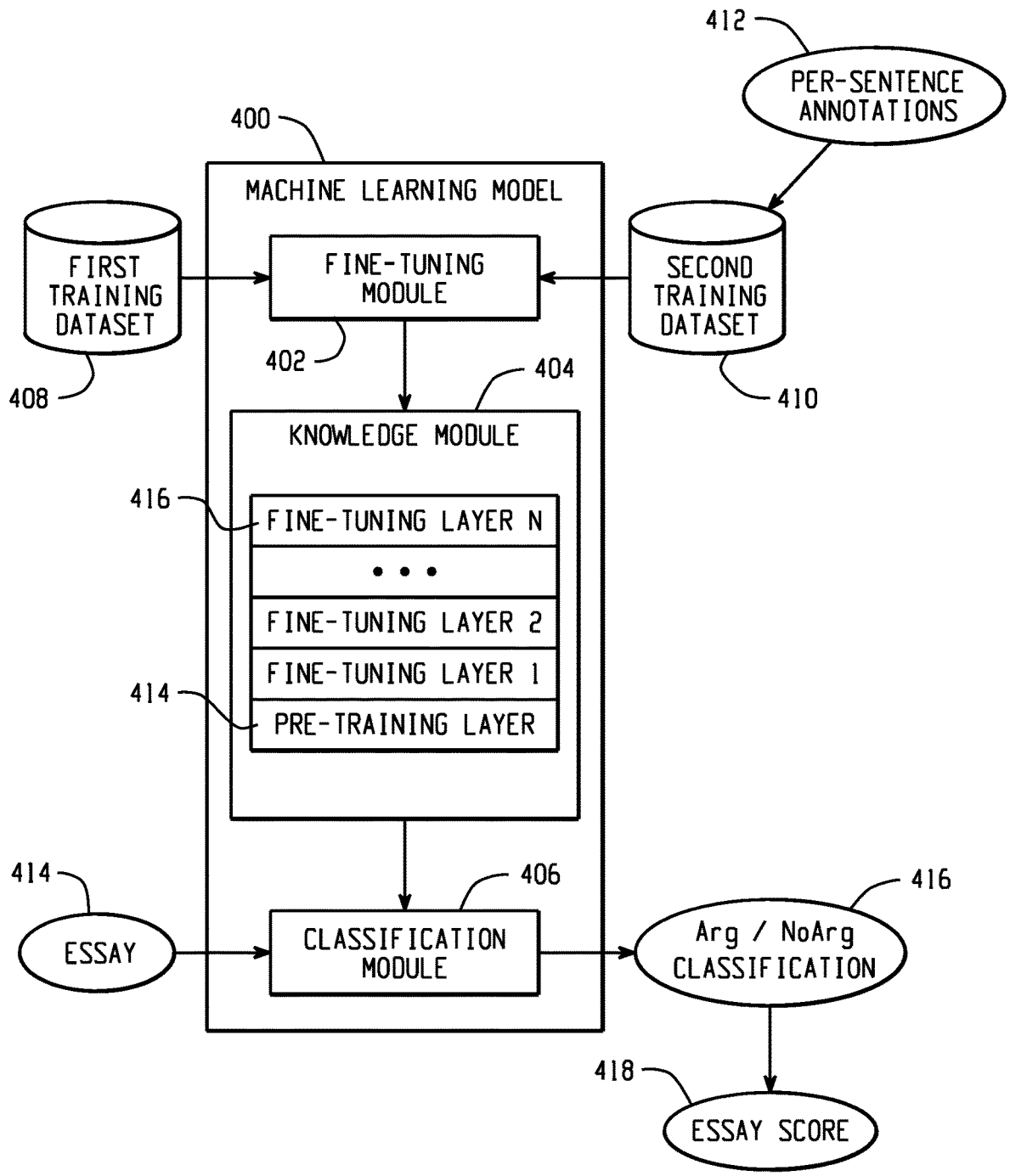
FIG. 4 is a block diagram depicting the components of a computer-implemented system for automatically evaluating an argument critique essay.

FIG. 4 is a block diagram depicting the components of a computer-implemented system for automatically evaluating an argument critique essay. At the center of the essay evaluation system is a machine learning model 400, which comprises a fine-tuning module 402, a knowledge module 404, and a classification module 406. The classification module 406 receives an essay 414 to be evaluated, and then generates a binary classification 416 for each sentence in the essay 414 indicating whether the sentence contains any valid criticism of the prompt. An essay score 418 is then calculated from the classification 416. The classification module 406 outputs the classification 416 by leveraging the knowledge module 404. The knowledge module 404 comprises knowledge represented as a series of superimposed layers 414 and 416, including a pre-training layer 414 and one or more fine-tuning layers 416. The fine-tuning module 402 generates the one or more fine-tuning layers 416 by learning from essays stored in training datasets. In the example of FIG. 4, the training datasets comprise a large first training dataset 408, and a comparatively smaller second training dataset 410. The first training dataset 408 contains unannotated argument critique essays written by authors of mature writing and reasoning skills, such as college students. The second training dataset 410 contains argument critique essays written by authors of comparable writing and reasoning skills as the author of the essay to be evaluated 414. The essays in the second training dataset are associated with per-sentence annotations 412, which indicate the presence of valid critique in each sentence.

Figure 5:
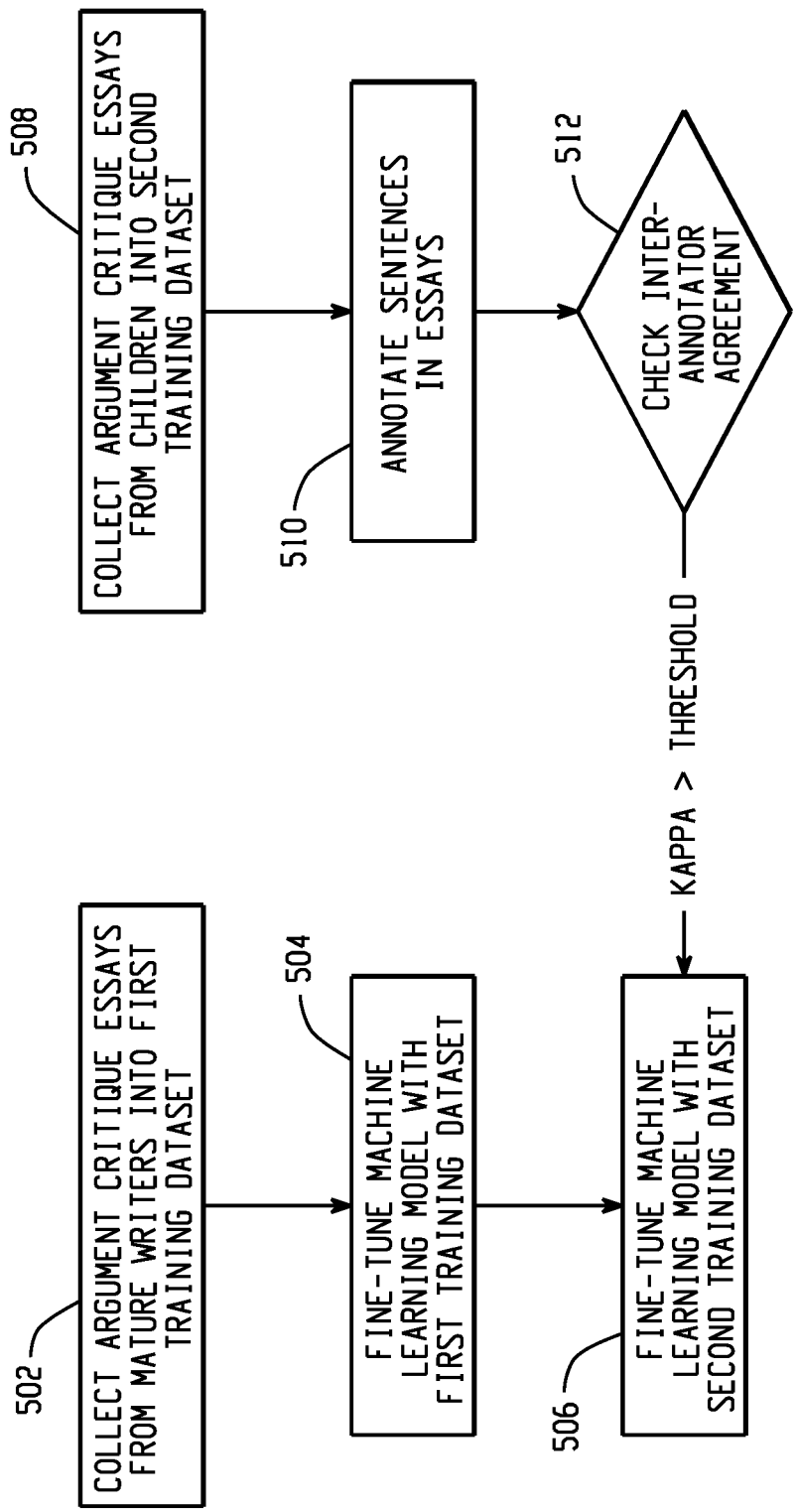
FIG. 5 is a flowchart diagram depicting a method for configuring a machine learning model for evaluating argument critique essay written by children.

FIG. 5 is a flowchart diagram depicting a method for configuring a machine learning model for evaluating argument critique essay written by children. At step 502, argument critique essays written by mature writers are collected into a first dataset. At step 504, the machine learning model is fine-tuned with the first training dataset. At step 506, the machine learning model is further fine-tuned with a second training dataset, wherein the second training dataset comprises argument critique essays written by children. The second training database is produced as a result of steps 508, 510, and 512. At step 508, argument critique essays written by children are collected into the second dataset. Optionally, the argument critique essays in the second training dataset are arranged as a plurality of paired sentences, as illustrated in FIG. 2. At step 510, each sentence of each essay in the second training dataset is annotated for whether it contains any valid critique. At step 512, the second training dataset is checked for the consistency level of sentence annotations among multiple annotators. This is accomplished by calculating the kappa statistic for the different annotators' Arg/NoArg classifications. The second training dataset is only used for fine-tuning in step 506 when the kappa statistic exceeds a certain pre-determined threshold.

FIG. 6 is a flowchart diagram depicting a computer-implemented method for automatically evaluating an argument critique essay. At step 602, a machine learning model is fine-tuned with a first training dataset. The first training database is produced as a result of step 610, in which argument critique essays written by mature writers are collected into the first training dataset. At step 604, the machine learning model is further fine-tuned with a second training dataset. The second training database is produced as a result of steps 612, 614, and 616. At step 612, argument critique essays written by children are collected into the second dataset. Optionally, the argument critique essays in the second training dataset are arranged as a plurality of paired sentences, as illustrated in FIG. 2. At step 614, each sentence of each essay in the second training dataset is annotated for whether it contains any valid critique. At step 616, the second training dataset is checked for the consistency level of sentence annotations among multiple annotators. This is accomplished by calculating the kappa statistic for the different annotators' Arg/NoArg classifications. The second training dataset is only used for fine-tuning in step 604 when the kappa statistic exceeds a certain predetermined threshold. At step 606, the fine-tuned machine learning model receives an argument critique essay to be evaluated. At step 608, the fine-tuned machine learning model classifies every sentence in the argument critique essay received as either containing a valid critique, or not containing any valid critique. Finally at step 618, a score is assigned to the argument critique essay received based on the sentence classification from step 608.

The methods and systems described herein may be implemented using any suitable processing system with any suitable combination of hardware, software and/or firmware, such as described below with reference to the non-limiting examples of FIGS. 7A-C.

Figure 7A:
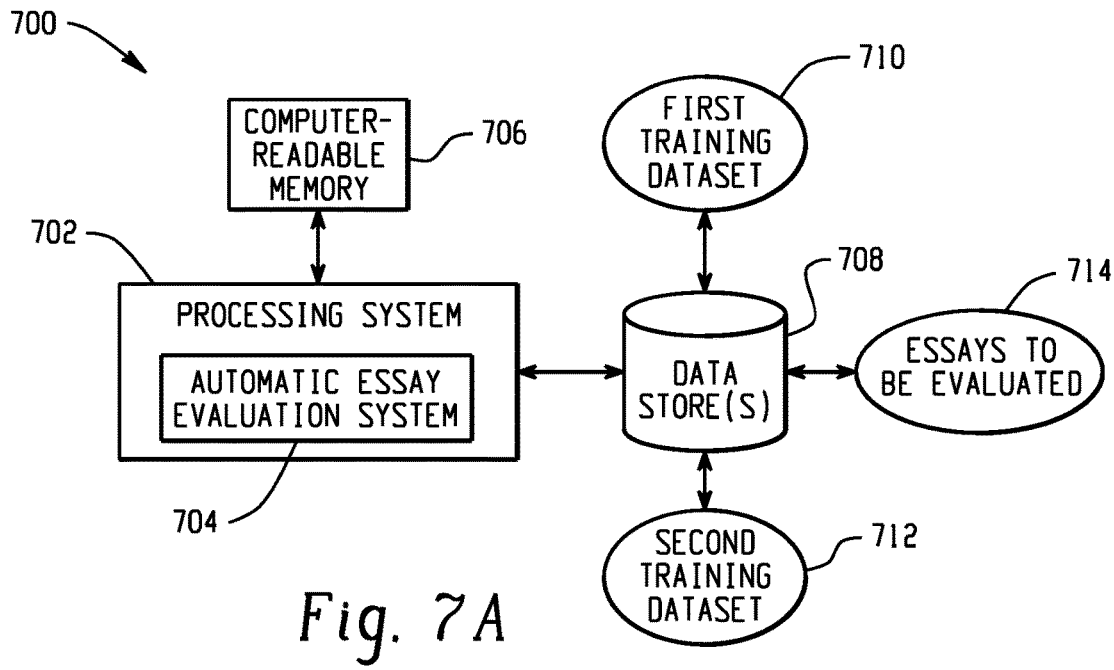
FIG. 7A depicts an exemplary system including a standalone computer architecture for implementing the approaches described herein.
Figure 7B:
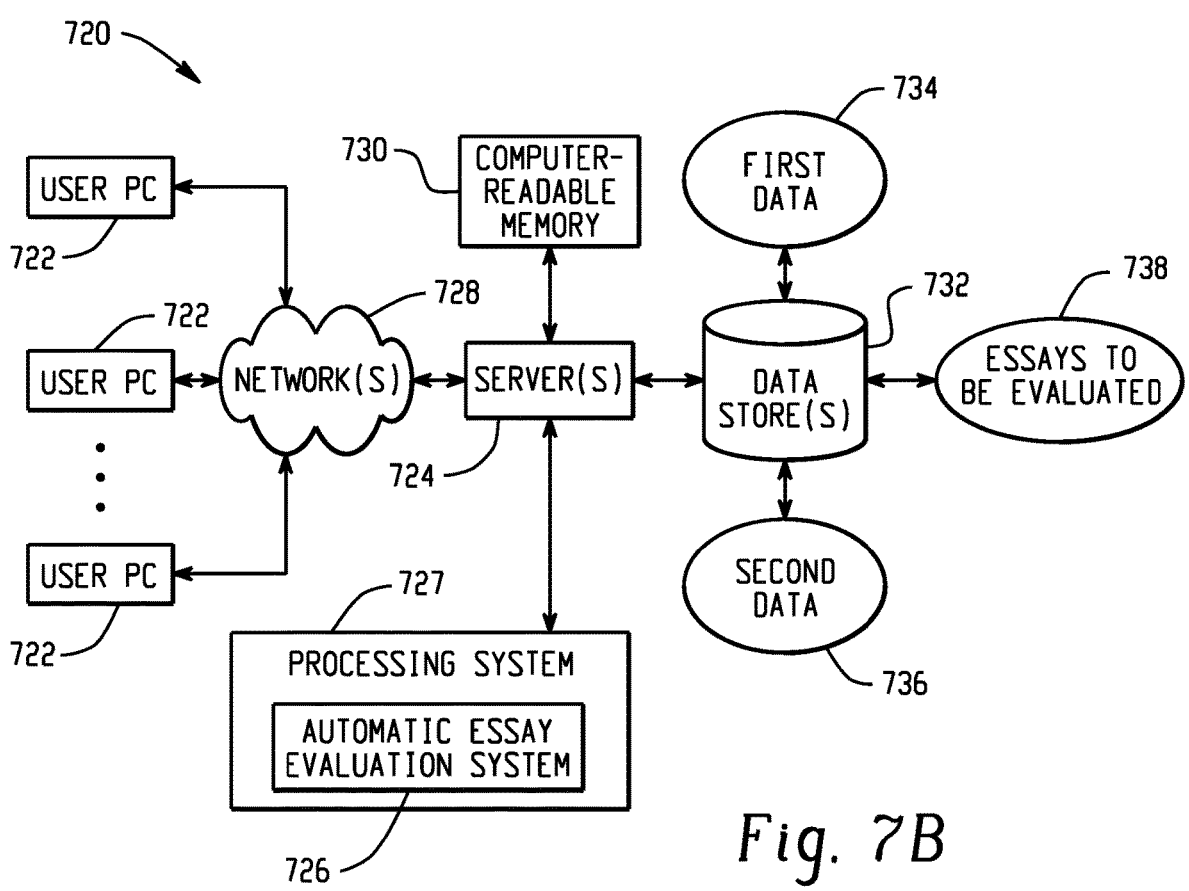
FIG. 7B depicts an exemplary system including a client-server architecture for implementing the approaches described herein.
Figure 7C:
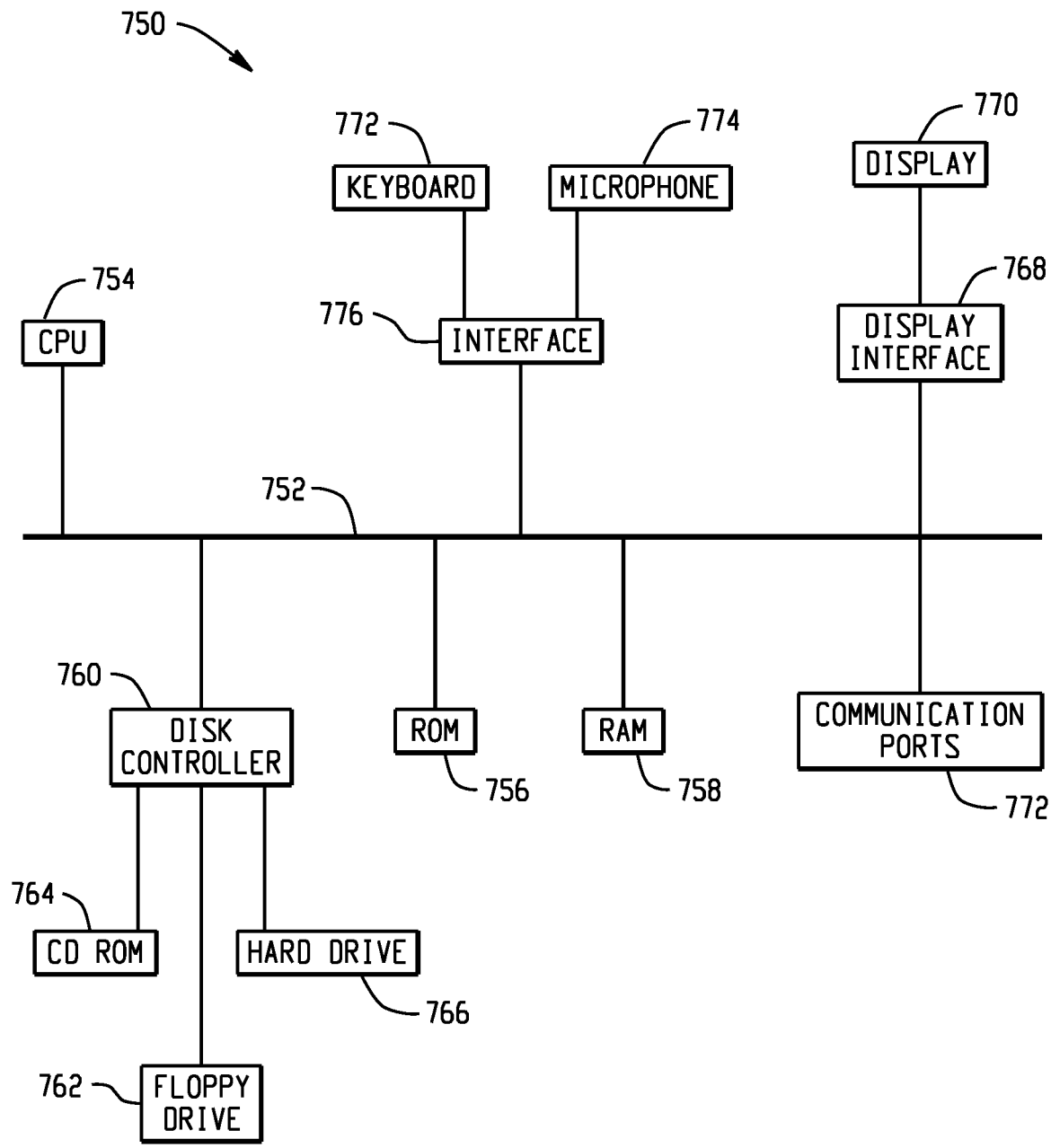
FIG. 7C depicts a block diagram of exemplary hardware for implementing the approaches described herein.

FIGS. 7A-C depict example systems for use in implementing a system. For example, FIG. 7A depicts an exemplary system 700 that includes a standalone computer architecture where a processing system 702 (e.g., one or more computer processors) includes an automatic essay evaluation system 704 being executed on it. In one embodiment, for example, the automatic essay evaluation system 704 is the system for automatically evaluating an argument critique essay written by a child in response to a prompt, as depicted in FIG. 3 or 4. The processing system 702 has access to a non-transitory computer-readable memory 706 in addition to one or more data stores 708. In one embodiment, for example, the non-transitory computer-readable memory 706 may be encoded with instructions for commanding the processing system 702 to execute the steps illustrated in FIG. 5 or 6. The one or more data stores 708 may contain data store 710 containing the first training dataset, data store 712 containing the second training dataset, and data store 714 containing the essays to be evaluated by the automatic essay evaluation system 704.

FIG. 7B depicts a system 720 that includes a client-server architecture. One or more user PCs 722 accesses one or more servers 724 running an automatic essay evaluation system 726 on a processing system 727 via one or more networks 728. In one embodiment, for example, the automatic essay evaluation system 726 is the system for automatically evaluating an argument critique essay written by a child in response to a prompt, as depicted in FIG. 3 or 4. The one or more servers 724 may access a non-transitory computer readable memory 730 as well as one or more data stores 732. In one embodiment, for example, the non-transitory computer-readable memory 730 may be encoded with instructions for commanding the processing system 727 to execute the steps illustrated in FIG. 5 or 6. The one or more data stores 732 may contain data store 734 containing the first training dataset, data store 736 containing the second training dataset, and data store 738 containing the essays to be evaluated by the automatic essay evaluation system 726.

FIG. 7C shows a block diagram of exemplary hardware for a standalone computer architecture 750, such as the architecture depicted in FIG. 7A, that may be used to contain and/or implement the program instructions of system embodiments of the present invention. A bus 752 may serve as the information highway interconnecting the other illustrated components of the hardware. A processing system 754 labeled CPU (central processing unit) (e.g., one or more computer processors), may perform calculations and logic operations required to execute a program. A non-transitory computer-readable storage medium, such as read only memory (ROM) 756 and random access memory (RAM) 758, may be in communication with the processing system 754 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 760 interfaces one or more optional disk drives to the system bus 752. These disk drives may be external or internal floppy disk drives such as 762, external or internal CD-ROM, CD-R, CD-RW or DVD drives such as 764, or external or internal hard drives 766. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 760, the ROM 756 and/or the RAM 758. Preferably, the processor 754 may access each component as required.

A display interface 768 may permit information from the bus 756 to be displayed on a display 770 in audio, graphic, or alphanumeric format. Communication with external devices may optionally occur using various communication ports 772.

In addition to the standard computer-type components, the hardware may also include data input devices, such as a keyboard 772, or other input device 774, such as a microphone, remote control, pointer, mouse and/or joystick.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

EXAMPLES

Certain embodiments are illustrated by the following non-limiting examples. The discussion below is offered to illustrate certain aspects of the present disclosure and is not intended to limit the scope of the claims. Changes may be made to the examples in light of the descriptions in this disclosure.

Example 1. $BERT_{bl}$

A dataset was constructed from argument critique essays that were collected from about 900 middle school students, which is described in Yi Song, Paul Deane, and Mary Fowles, Examining Students' Ability to Critique Arguments and Exploring the Implications for Assessment and Instruction, ETS Research Report Series, 2017(16):1-12. All sentences containing any material belonging to a valid critique were marked as Arg, and the rest were denoted as NoArg. Inter-annotator agreement for this sentence-level Arg/NoArg classification was κ=0.71. The dataset was split into a training partition containing 585 responses, and a test partition containing 252 responses. The training partition contained 2,220 sentences (515 Arg; 1,705 NoArg; 11 words per sentence on average (standard deviation=8.03)). The test partition contained 973 sentences.

A pre-trained BERT model (the "bert-base-uncased" version) was fine-tuned with the data in the training partition. During training, the class weights were proportional to the numbers of Arg and NoArg instances, while the other parameters were kept as default. The resulting model was $BERT_{bl}$.

Example 2. $BERT_{pair}$

The same pre-trained BERT model in Example 1 was re-utilized while transforming the training instances to paired sentence instances, where the first sentence was the candidate Arg or NoArg sentence and the second sentence of the pair was the immediate next sentence in the essay. For example, the excerpt 120 was arranged as a paired sentence training instance 210 as illustrated in FIG. 2. A special token "END SENTENCE" was used when the candidate Arg or NoArg sentence was the last sentence in the essay. The resulting model was $BERT_{pair}$.

Example 3. $BERT_{bl-lm}$

The same pre-trained BERT model in Example 1 was first fine-tuned with a large corpus of college-level argument critique essays. These essays were similar to those analyzed in Beata Beigman Klebanov, Binod Gyawali, and Yi Song, Detecting Good Arguments in a Non-Topic-Specific Way: An Oxymoron? Proceedings of the 55th Annual Meeting of the Association for Computational Linguistics (Volume 2: Short Papers), pages 244-249, Vancouver, Canada, Association for Computational Linguistics. This corpus consisted of 351,363 unannotated essays, where an average essay contained 16 sentences, resulting in a corpus of 5.64 million sentences. The pre-trained BERT language model was first fine-tuned on this large corpus for five epochs. The model was then fine-tuned again with the training partition described in Example 1. The resulting model is $BERT_{bl+lm}$.

Example 4. $BERT_{pair+lm}$

The same pre-trained BERT model in Example 1 was first fine-tuned with the large corpus as described in Example 3. The model was then fine-tuned again with the paired instances of the training partition as described in Example 2. The resulting model was $BERT_{pair+lm}$.

Example 5. Evaluation

The four models described in Examples 1 to 4 were tested with the test partition of the dataset described in Example 1. The measured precision (P), recall (R), and F1 scores are shown in Table 1.

TABLE 1

| Model | Category | P | R | F1 |
|---|---|---|---|---|
| $BERT_{bl}$ | NoArg | 0.884 | 0.913 | 0.898 |
|  | Arg | 0.603 | 0.523 | 0.560 |
| $BERT_{pair}$ | NoArg | 0.892 | 0.934 | 0.913 |
|  | Arg | 0.681 | 0.556 | 0.612 |
| $BERT_{bl+lm}$ | NoArg | 0.907 | 0.898 | 0.902 |
|  | Arg | 0.610 | 0.636 | 0.623 |
| $BERT_{pair+lm}$ | NoArg | 0.929 | 0.871 | 0.900 |
|  | Arg | 0.592 | 0.740 | 0.658 |

For $BERT_{bl}$, the F1 score for Arg is 56%. This confirmed that BERT was able to perform well even after fine-tuning with a relatively small training corpus with default parameters. In comparison, for $BERT_{pair}$, with the paired-sentences transformation of the instances, the F1 score improved to 61.2%, which was a boost of 5% over $BERT_{bl}$. Furthermore, for $BERT_{bl+lm}$, that the additional fine-tuning of the language model with the large corpus of college-level essays improved F1 to 62.3%. Finally for $BERT_{pair+lm}$, it resulted in the highest F1 score of 65.8%, approximately 5% higher than $BERT_{pair}$.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents. All publications, patents, and patent applications cited in this specification are incorporated herein by reference as if each such publication, patent, or patent application were specifically and individually indicated to be incorporated herein by reference.

It is claimed:

1. A computer-implemented method for automatically evaluating an argument critique essay, the method comprising:
   fine-tune a machine learning model with a first training dataset, wherein the first training dataset comprises argument critique essays written by mature writers, and the argument critique essays in first training dataset are unannotated;
   fine-tune the machine learning model with a second training dataset, wherein the second training dataset comprises argument critique essays written by young writers, and each sentence of each argument critique essay in the second training dataset is annotated for whether the sentence contains any valid critique;
   receive the argument critique essay to be evaluated;
   classify by the machine learning model every sentence in the argument critique essay to be evaluated as either (i) containing a valid critique, or (ii) not containing any valid critique.

2. The computer-implemented method of claim 1, wherein the argument critique essay to be evaluated is written by a child, wherein the mature writers are college students, and wherein the young writers are middle school students.

3. The computer-implemented method of claim 1, wherein the fine-tuning of the machine learning model with the second training dataset comprises:
   fine-tune the machine learning model with a plurality of paired sentences in the second training dataset, wherein each pair in the plurality of paired sentences comprises (i) a first sentence that is annotated for whether the sentence contains any valid critique, and (ii) a second sentence that is an immediate next sentence following the first sentence in an argument critique essay in the second training dataset.

4. The computer-implemented method of claim 3, wherein the second sentence is replaced with a special token when the first sentence is a last sentence in the argument critique essay in the second training dataset.

5. The computer implemented method of claim 1, wherein the machine learning model is a transformer.

6. The computer implemented method of claim 5, wherein the machine learning model is pre-trained for natural language processing.

7. The computer implemented method of claim 1, wherein the method further comprises:
   assigning a score to the argument critique essay to be evaluated based on a total number of sentences in the argument critique essay that are classify by the machine learning model as containing a valid critique.

8. The computer-implemented method of claim 1, wherein the first training dataset comprises at least 5 million sentences, and the second training dataset comprises a smaller number of sentences than the first training dataset.

9. The computer-implemented method of claim 8, wherein the second training dataset comprises no more than 3,000 sentences.

10. The computer-implemented method of claim 1, wherein the second training dataset is annotated by a plurality of annotators, and an inter-annotator agreement among the plurality of annotators has a kappa value of at least 0.6.

11. The computer implemented method of claim 1, wherein a valid critique comprises any criticism of a prompt on a ground of over-generalization, irrelevant example, misrepresentation of events, or neglecting negative side effects.

12. A system for automatically evaluating an argument critique essay written by a child in response to a prompt, the system comprising:
   a processor; and
   a computer-readable memory in communication with the processor, the computer-readable memory is encoded with instructions for commanding the processor to execute steps comprising:
      receive the argument critique essay to be evaluated; and
      classify by a machine learning model every sentence in the argument critique essay to be evaluated as either (i) containing a valid critique, or (ii) not containing any valid critique; wherein a valid critique comprises any criticism of the prompt on a ground of over-generalization, irrelevant example, misrepresentation of events, or neglecting negative side effects;
   wherein the machine learning model is fine-tuned using:
      a first training dataset, wherein the first training dataset comprises argument critique essays written by adults, and the argument critique essays in first training dataset are unannotated; and
      a second training dataset, wherein the second training dataset comprises argument critique essays written by children, and each sentence of each argument critique essay in the second training dataset is annotated for whether the sentence contains any valid critique.

13. The system of claim 12, wherein the machine learning model is a transformer pre-trained for natural language processing.

14. The system of claim 12, wherein the machine learning model is Bidirectional Encoder Representations from Transformers (BERT).

15. The computer-implemented method of claim 12, wherein the second training dataset comprises a smaller number of essays than the first training dataset.

16. The computer-implemented method of claim 12, wherein the fine-tuning of the machine learning model with the second training dataset comprises:
   fine-tune the machine learning model with a plurality of paired sentences in the second training dataset, wherein each pair in the plurality of paired sentences comprises (i) a first sentence that is annotated for whether the sentence contains any valid critique, and (ii) a second sentence that is an immediate next sentence following the first sentence in an argument critique essay in the second training dataset.

17. The computer-implemented method of claim 16, wherein the second sentence is replaced with a special token when the first sentence is a last sentence in the argument critique essay in the second training dataset.

18. A method for configuring a machine learning model for evaluating argument critique essay written by children, the method comprising:
   fine-tune the machine learning model with a first training dataset, wherein the first training dataset comprises argument critique essays written by mature writers, and the argument critique essays in first training dataset are unannotated;

fine-tune the machine learning model with a second training dataset, wherein the second training dataset comprises argument critique essays written by children, the argument critique essays written by children are arranged as a plurality of paired sentences, wherein each pair in the plurality of paired sentences comprises:
  (i) a first sentence that is annotated for whether the sentence contains any valid critique, wherein a valid critique comprises any criticism of on a ground of over-generalization, irrelevant example, misrepresentation of events, or neglecting negative side effects; and
  (ii) a second sentence that is an immediate next sentence following the first sentence in an argument critique essay in the second training dataset, wherein the second sentence is replaced with a special token when the first sentence is a last sentence in the argument critique essay.

19. The method of claim 18, wherein the machine learning model is a transformer pre-trained for natural language processing.

20. The method of claim 18, wherein the second training dataset comprises no more than 3,000 sentences, and the sentences in the second training dataset are annotated by a plurality of annotators, and an inter-annotator agreement among the plurality of annotators has a kappa value of at least 0.6.

* * * * *